United States Patent [19]

Ohzeki et al.

[11] 4,258,142
[45] Mar. 24, 1981

[54] CLARIFIED OLEFIN POLYMER COMPOSITION

[75] Inventors: Toshio Ohzeki, Urawa; Mitsuo Akutsu, Katsushika; Junji Kawai, Arakawa, all of Japan

[73] Assignee: Argus Chemical Corp., Brooklyn, N.Y.

[21] Appl. No.: 937,961

[22] Filed: Aug. 30, 1978

[51] Int. Cl.³ .................... C08K 23/06; C08K 23/12; C08K 23/20; C09K 3/00
[52] U.S. Cl. ........................... 525/2; 252/182; 428/339
[58] Field of Search .................. 526/2; 525/2; 252/1, 252/182

[56] References Cited

U.S. PATENT DOCUMENTS

| | | | |
|---|---|---|---|
| 3,207,735 | 9/1965 | Wijga | 526/4 |
| 3,207,736 | 9/1965 | Wijga | 526/4 |
| 3,207,737 | 9/1965 | Wales | 526/4 |
| 3,207,738 | 9/1965 | Wijga | 526/4 |
| 3,207,739 | 9/1965 | Wales | 526/4 |
| 3,274,014 | 9/1966 | Harrington et al. | 260/45.75 W |
| 3,404,140 | 10/1968 | Fukumoto et al. | 526/2 |
| 3,432,472 | 3/1969 | Caldwell | 526/2 |
| 3,437,641 | 4/1969 | Lenz et al. | 526/2 |
| 3,983,290 | 9/1976 | Elcik | 526/2 |
| 3,997,551 | 12/1976 | Minagawa et al. | 546/276 |
| 4,016,118 | 4/1977 | Hamada et al. | 260/17.4 SG |

FOREIGN PATENT DOCUMENTS

49-37572  9/1974  Japan.

*Primary Examiner*—Stanford M. Levin
*Attorney, Agent, or Firm*—Otto S. Kauder

[57] ABSTRACT

The clarity of molded olefin polymer specimens is augmented by incorporating 0.005 to 5% by weight of the olefin polymer of a phenyl phosphate compound having the formula

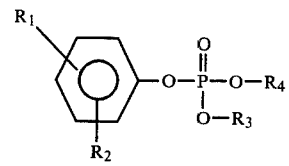

in which $R_1$ and $R_2$ are independently selected from the group consisting of a hydrogen atom, an alkyl group having 1 to 18 carbon atoms, an alkoxy group having 1 to 18 carbon atoms, a cycloalkyl group having 5 to 12 carbon atoms, a phenyl group, a phenoxy group, and a group

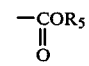

in which $R_5$ is a hydrogen atom or an alkyl group having 1 to 18 carbon atoms; $R_3$ is selected from the group consisting of an alkyl group having 1 to 18 carbon atoms,

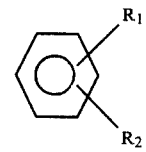

, and $R_4$; and $R_4$ is a hydrogen atom or a metal atom equivalent $M_{1/a}$ where a is the valence of the metal atom M.

In the presence of such a phenyl phosphate, further improvements in clarity are obtained by also incorporating certain metal compounds.

21 Claims, No Drawings

CLARIFIED OLEFIN POLYMER COMPOSITION

BACKGROUND OF THE INVENTION

This invention relates to olefin polymer compositions, for example polypropylene, polyethylene, and poly-1-butene, having improved clarity as a result of incorporating an additive therein, and to additive compositions that improve the clarity of olefin compositions when incorporated therein in modest concentrations.

Low density polyethylene has been known for many years to have a crystalline structure. Additional crystalline polymers such as high-density polyethylene, isotactic polypropylene, poly-1-butene, and poly-4-methylpentene have become available as a result of the development of the so-called stereospecific Ziegler-Natta catalyst system for the polymerization of alpha-olefins.

Such crystalline polymers possess special properties, not available in amorphous polymers, which are of steadily increasing commercial interest and importance. Certain properties of these crystalline polymers, particularly optical and strength properties, and processing characteristics, depend to a very significant extent upon the polymer microstructure.

According to C. J. Kuhre et al (SPE Journal, 1964, Volume 20, pages 1,113–1,119), rapid cooling from the molten state, promotes a favorable microstructure by producing small spherulites and leads to improved clarity and toughness for polypropylene. However quenching is, in general, applicable with maximum effect only to plastic fabricated with relatively thin section thickness, such as film or thin sheet. While some advantage can be gained in terms of improved microstructure by rapid cooling of plastic articles of relatively thick section, the effect is restricted by heat transfer limitations mainly to the surface shell of the plastic. Certain additives promote the formation of smaller, more numerous spherulites in crystalline polymers. Use of such crystallization modifiers has the distinct and important advantage that their effect is not limited to plastic articles of thin cross-section; a more favorable microstructure forms throughout the entire mass of the polymer.

As a crystalline polymer cools from the molten state, crystallites begin to form below the melting point, as supercooling progresses. The crystallites cluster about central nuclei to form spherulites which grow radially outward by addition of more crystallites as crystallization proceeds. Since the spherulites are birefringent their growth can be readily observed with a polarizing microscope equipped with a hot stage.

Use of small amounts of finely-ground, higher-melting polymers, such as polytetrafluoroethylene, nylon, polyhexamethylene terephthalate, or isotactic polyethylene in low-density polyethylene, and nylons 610 or 66 in nylon 11 result in improved transparency, similar to the improvement obtained by rapid quenching of thin films. This improvement is attributed to the smaller, more numerous spherulites promoted by nucleation, in the case of the polymeric additives, and by rapid cooling, which minimizes spherulite size in the case of quenching. Certain inorganic additives, such as very fine silica, also show some nucleating effect in crystalline polymers. There are a number of other substances which are highly effective as nucleating agents in polypropylene.

An example of these new nucleating agents are the metal salts of organic acids. Metals whose carboxylic acid salts are effective include sodium, magnesium, calcium, aluminum and titanium. The organic acid portion of the salt may be chosen from a variety of either mono- or di-carboxylic acids. Examples of suitable monobasic acids are benzoic, cyclohexane carboxylic, diphenyl acetic, and isonicotinic acids. Dicarboxylic acids such as succinic, adipic, sebacic, and phthalic acids give salts of similar activity. The efficiency of the nucleating agents varies with the choice of metal and acid used. Some of the more promising compounds are effective at concentrations well below 0.5% w.

Kuhre et al here summarize the disclosures of P. Wijga in U.S. Pat. Nos. 3,207,735, 3,207,736, and 3,207,738, and M. Wales in U.S. Pat. Nos. 3,207,737, and 3,207,739, all of Sept. 21, 1966. In Wijga (735), the materials which result in the production of polypropylene of improved physical properties are cyclic monocarboxylic acids having the carboxyl group attached to a carbon atom of a 5 to 6 membered ring, and corresponding anhydrides, referred to as "benzoic acid type compounds". The improvement is said to be obtained when a benzoic acid type compound is present as a liquid, dissolved or thoroughly dispersed in the polymer melt prior to the final crystallization thereof by cooling. In Wijga (736) the materials used similarly are aliphatic, cycloaliphatic, and aromatic dicarboxylic or higher polycarboxylic acids and corresponding anhydrides. In Wijga (738) the materials used similarly are terminal aliphatic monocarboxylic acids substituted with carbocyclic groups, also referred to as arylalkanoic acid type compounds. In Wales (737) the materials used similarly are salts of aluminum with certain carboxylic or polycarboxylic acids, and in Wales (739) the materials used similarly are salts of sodium and, to a lesser degree, other metals from Groups Ia and IIa of the Periodic table, with certain carboxylic and polycarboxylic acids.

R. Harrington, in U.S. Pat. No. 3,274,014 of Sept. 20, 1966 disclosed yarn compositions having incorporated a small amount of a metal monoalkyl or monoaryl phosphate, metal dialkyl phosphate, metal alkyl phosphonate, metal alkyl (alkyl phosphonate), or metal dialkyl phosphite that are resistant to ultraviolet light. Nothing is disclosed as to any effect on clarity or crystallization behavior of the yarn polymers, and since the yarns can be pigmented any such effects would have been overlooked.

K. Yamamoto in Japanese Pat. No. 15,185/69 of July 15, 1969 disclosed polypropylene compositions of regulated molecular weight containing organotin compounds as molecular weight modifying agents and esters of acids of phosphorus to prevent discoloration. All the disclosed esters are aliphatic esters, for example dibutyl phosphite, dialuryl phosphite, triethyl phosphate, tributyl phosphate, and bis(2-ethylhexyl phosphate). K. Shirayama in Japanese Pat. No. 12,903/71 of Apr. 2, 1971 disclosed crystalline polypropylene compositions of improved transparency and stiffness containing diphenylphosphinic acid represented by the formula

or its magnesium, calcium, sodium, or aluminum salts as a nucleating agent. In Japanese Pat. No. 21,939/71 of June 22, 1971, K. Shirayama disclosed phenylphosphonic acid, phenyl phosphonous acid, phenylarsonic acid, or a Na,Mg,Ca, or Al salt of one of these acids as a nucleating agent for polypropylene. K. Hamada in U.S. Pat. No. 4,016,118 of Apr. 5, 1977 disclosed aliphatic polyolefins with increased transparency and reduced shrinkage containing 0.1 to 0.7% dibenzylidenesorbitol.

SUMMARY OF THE INVENTION

In accordance with this invention, the clarity of an olefin polymer is improved by incorporating in a polymer of an alpha-olefin having 2 to 6 carbon atoms from 0.005 to 5 parts by weight per 100 parts by weight of olefin polymer of at least one phenyl phosphate clarifier compound having the formula

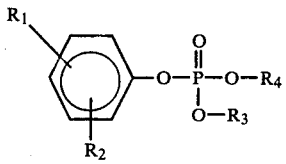

in which $R_1$ and $R_2$ are independently selected from the group consisting of a hydrogen atom, an alkyl group having 1 to 18 carbon atoms, an alkoxy group having 1 to 18 carbon atoms, a cycloalkyl group having 5 to 12 carbon atoms, a phenyl group, a phenoxy group, and a group

in which $R_5$ is a hydrogen atom or an alkyl group having 1 to 18 carbon atoms; $R_3$ is selected from the group consisting of an alkyl group having 1 to 18 carbon atoms,

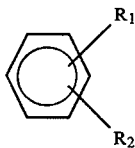

, and $R_4$; and $R_4$ is a hydrogen atom or a metal atom equivalent $M_{1/a}$ where a is the valence of the metal atom M.

Also in accordance with this invention, a further improvement in clarity is obtained by using in combination with a phenyl phosphate clarifier as above defined from 0.3 to 3 parts by weight per part by weight of phenyl phosphate compound of a metal compound selected from metal salts of non-nitrogenous monocarboxylic acids having 6 to 18 carbon atoms, metal oxides, metal hydroxides, metal chlorides, and metal carbonates. The amount of metal compound so used will not usually exceed 1 part per 100 parts of olefin polymer.

Clarifier compositions can be formulated by combining a phenyl phosphate clarifier with a metal compound as above defined in a homogeneous composition that can be liquid or solid. The metal compounds used are preferably compounds of at least one of the metals magnesium, calcium, strontium, and barium. The most favorable proportions of phenyl phosphate compound and metal compound within the above defined range are approximately equal quantities of each, preferably ranging from 0.1:1.1 to 1.1:0.9 by weight.

Phenyl phosphate clarifier compounds incorporated in olefin polymer compositions according to this invention alone or in combination with a metal compound also provide the added advantages of increased impact strength and heat distortion temperature, and can be used together with any of the known olefin polymer stabilizers and antioxidants without interfering with the desired effectiveness of such stabilizers and anti-oxidants.

DESCRIPTION OF THE PREFERRED EMBODIMENTS

The olefin polymers clarified according to this invention by incorporating a phenyl phosphate clarifier compound are homopolymers and copolymers of alpha-olefins having 2 to 6 carbon atoms, including low density polyethylene, high density polyethylene, polypropylene, poly-1-butene, poly-3-methylbutene and poly-4-methylpentene; copolymers of ethylene in major proportion with minor proportions of propylene, 1-butene, 1-hexene, vinyl acetate, ethyl acrylate, and vinyl chloride; copolymers of propylene in major proportions with minor proportions of ethylene, 1-butene, or vinyl chloride; and others.

The phenyl phosphate clarifier compounds defined by the above formula are esters of phosphoric acid having per phosphate ester group at least one and not more than two phenyl groups. The term phenyl is used in the generic sense to deisgnate both the unsubstituted phenyl ($C_6H_5$) group and phenyl groups having one or two substituents $R_1$ and $R_2$ other than hydrogen, as defined above.

Alkyl groups having 1 to 18 carbon atoms present at $R_1$, $R_2$, $R_3$, and $R_5$ in the above formula include methyl, ethyl, n-propyl, isopropyl, n-butyl, isobutyl, s-butyl, t-butyl, 2-pentyl, isopentyl, neopentyl, t-hexyl, n-hexyl, 4-methyl-2-pentyl, n-heptyl, 3-heptyl, 2-ethylhexyl, isooctyl, n-octyl, isononyl, nonyl from propylene trimer, 2-octyl,3,5,5-trimethylhexyl, isodecyl, decyl, undecyl, n-dodecyl, 2-butyloctyl, dodecyl from propylene tetramer, isotridecyl, n-tetradecyl, n-hexadecyl, n-octadecyl, and alkyl groups resulting from the use of commercial alcohol mixtures and olefin mixtures. Alkoxy groups present at $R_1$ and $R_2$ in the above formula include any of the recited alkyl groups linked to the phenyl group through oxygen. Cycloalkyl groups present at $R_1$ and $R_2$ in the above formula include cyclopentyl, 1-methylcyclopentyl, cyclohexyl, 1-methylcyclohexyl, 2-methylcyclohexyl, 4-methylcyclohexyl, 4-t-butylcyclohexyl, cyclooctyl and cyclododecyl.

Metal atoms M present at $R_4$ in the above formula include barium, calcium, magnesium, potassium, sodium, zinc, and aluminum as a preferred class of metals. The proportions of metal to phosphate in a metal-containing phenyl phosphate clarifier according to this invention depend on the valence of the metal and the number of esterifying phenyl or other hydrocarbon $R_3$ groups present for each phosphate group. The range of possibilities can be illustrated by considering the sodium, calcium, and aluminum derivatives of phenyl phosphate and of diphenyl phosphate, abbreviated

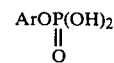

and

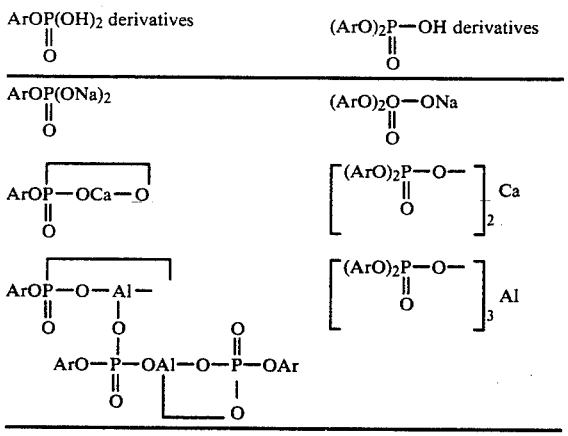

respectively, to represent one-valent, two-valent, and three valent metals.

These formulae express the stoichiometric relationships between phenyl phosphate groups and metal atoms in the metal derivatives but not necessarily their detailed structure.

These compounds are liquids, waxy materials, or crystalline solids, held together in such a way that it is not possible to determine with certainty whether a given metal metal atom is linked to a given phosphate group or another since each metal atom is in close proximity to several phosphate groups and each phosphate group is in close proximity to several metal atoms. Thus, the indicated "cyclic monomer" formula of a calcium phenyl phosphate, for example, must be considered equally probably to "cyclic dimer", "cyclic trimer", chain polymer, or spatial polymer formula that can also be written for this product.

Within the class of phenyl phosphate clarifier compounds according to this invention, the metal salts of diphenyl phosphates represent a preferred group, and within this preferred group the calcium, magnesium, potassium, and sodium salts of di(p-t-butylphenyl) phosphate are particularly preferred.

When the phenyl phosphate clarifier compound according to this invention is used in an additive composition together with a metal carboxylate, oxide, hydroxide, chloride, or carbonate, the metal carboxylate can be any one or more of the barium, calcium, magnesium, and strontium salts of a non-nitrogeneous monocarboxylic acid having 6 to 18 carbon atoms. The aliphatic, aromatic, alicyclic, and oxygen-containing heterocyclic carboxylic acids are operable as a class. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, sorbic acid, 2-ethylhexoic acid, n-octoic acid, isooctoic acid, 3,5,5-trimethylhexoic acid, capric acid, neodecanoic acid, undecylic acid, lauric acid, myristic acid, palmitic acid, margaric acid, stearic acid, oleic acid, ricinoleic acid, chlorocaproic acid, 12-hydroxystearic acid, benzoic acid, phenylacetic acid, butylbenzoic acid, ethylbenzoic acid, propylbenzoic acid, hexylbenzoic acid, salicylic acid, naphthoic acid, 1-naphthalene-acetic acid, orthobenzoyl benzoic acid, hexahydrobenzoic acid, and methyl furoic acid, as well as partially esterified dibasic acids such as monobutyl phthalate, isooctyl maleate, ethylene glycol maleate, and 2-ethoxy ethylsuccinate.

When the phenyl phosphate clarifier compound according to this invention is used in an additive composition together with a metal oxide, hydroxide, chloride, or carbonate, the metal compound can be any one or more of barium oxide, barium hydroxide, barium chloride, barium carbonate, calcium oxide, calcium carbonate, calcium hydroxide, calcium chloride, magnesium oxide, magnesium carbonate, magnesium chloride, magnesium hydroxide, strontium oxide, strontium chloride, strontium hydroxide, and strontium carbonate.

The phenyl phosphate clarifier compounds used in olefin polymer compositions according to this invention are not olefin polymer stabilizers. However, it is a feature of this invention that the use of phenyl phosphate clarifier compounds according to this invention does not adversely affect stability of olefin polymers and satisfactory heat and light stability results are obtained with conventional heat and light stabilizers used in conventional concentrations. Representative olefin polymer stabilizers that can be used include organic phosphites, as disclosed by M. Minagawa et al in U.S. Pat. No. 3,997,551 at column 15 line 63 to column 19 line 26; phenols, as disclosed in this patent at column 19 line 27 to column 25 line 68; thiodipropionic acid esters, as disclosed in this patent at column 26 line 1 to column 28 line 33; and other olefin polymer stabilizers disclosed in this patent at column 29 line 17 to column 30 line 10. These disclosures are here incorporated by reference.

The phenyl phosphate clarifier compounds used according to this invention and olefin polymer stabilizers can be formulated as a simple mixture for incorporation into the olefin polymer by the polymer manufacturer or converter. The clarifier compounds and stabilizers are incorporated in the polymer in suitable mixing equipment, such as a mill, Barnbury mixer, or extruder-pelletizer system. Mixing is continued until the mixture is substantially uniform and can be removed to shaping equipment for fabrication into desired products by calendering, extrusion, or injection molding.

In the following Examples there are used according to this invention phenyl phosphate compounds shown by name and formula in Table 1. These phenyl phosphate compounds are known compounds or homologs of known compounds readily prepared by known methods.

TABLE 1
PHENYL PHOSPHATE COMPOUNDS

| | | PHYSICAL CONDITION |
|---|---|---|
| No. 1 | Diphenyl phosphate 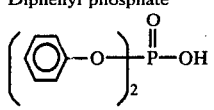 | LIQUID |
| No. 2 | Di-o-tolyl phosphate 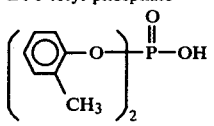 | LIQUID |
| No. 3 | Di-m-tolyl phosphate 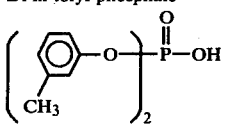 | LIQUID |
| No. 4 | Di-P-tolyl phosphate 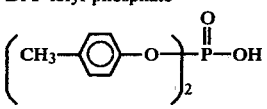 | LIQUID |
| No. 5 | Di-3,5-dimethylphenyl phosphate 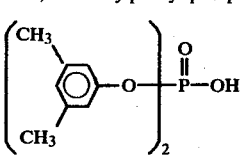 | WAXY SOLID M.P. BELOW 110° C. |
| No. 6 | Di-p-isopropylphenyl phosphate 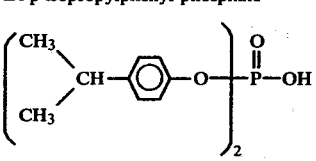 | WAXY SOLID M.P. BELOW 110° C. |
| No. 7 | Di-p-t-butylphenyl phosphate 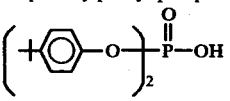 | WAXY SOLID M.P. BELOW 110° C. |
| No. 8 | Di(2,4-di-t-butylphenyl) phosphate 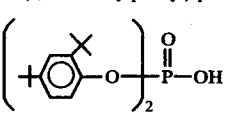 | WAXY SOLID M.P. BELOW 110° C. |
| No. 9 | Di-p-t-amyl phenyl phosphate 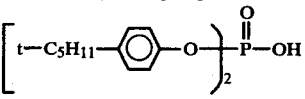 | WAXY SOLID M.P. BELOW 110° C. |
| No. 10 | Di-p-nonylphenyl phosphate 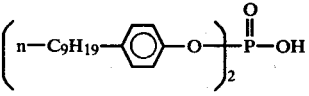 | WAXY SOLID M.P. BELOW 110° C. |
| No. 11 | Di-p-t-octyl phenyl phosphate 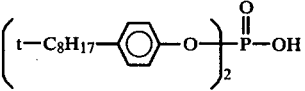 | WAXY SOLID M.P. BELOW 110° C. |
| No. 12 | Di-4-biphenylyl phosphate 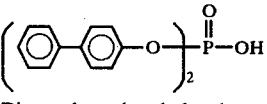 | WAXY SOLID M.P. BELOW 110° C. |
| No. 13 | Di-p-methoxyphenyl phosphate | |

TABLE 1-continued
PHENYL PHOSPHATE COMPOUNDS

| Compound | Physical Condition |
|---|---|
| $\left(CH_3-O-\bigcirc-O\right)_2 P(=O)-OH$ <br> No. 14 Di-p-octoxyphenyl phosphate | WAXY SOLID M.P. BELOW 110° C. |
| $\left(C_8H_{17}-O-\bigcirc-O\right)_2 P(=O)-OH$ <br> No. 15 Phenyl phosphate | WAXY SOLID M.P. BELOW 110° C. |
| $\bigcirc-O-P(=O)(OH)_2$ <br> No. 16 p-Tolyl phosphate | CRYSTALLINE M.P. 97–98° C. |
| $CH_3-\bigcirc-O-P(=O)(OH)_2$ <br> No. 17 p-t-Butylphenyl phosphate | CRYSTALLINE M.P. 116° C. |
| $(CH_3)_3C-\bigcirc-O-P(=O)(OH)_2$ <br> No. 18 p-Phenoxyphenyl Phosphate | CRYSTALLINE M.P. 184–186° C. |
| $\bigcirc-O-\bigcirc-O-P(=O)(OH)_2$ <br> No. 19 Phenyl dodecyl phosphate | CRYSTALLINE M.P. 127–129° C. |
| $\bigcirc-O, C_{12}H_{23}-O \rangle P(=O)-OH$ <br> No. 20 p-Tolyl octadecyl phosphate | LIQUID |
| $CH_3-\bigcirc-O, C_{18}H_{37}-O \rangle P(=O)-OH$ <br> No. 21 p-t-Butylphenyl octyl phosphate | LIQUID |
| $(CH_3)_3C-\bigcirc-O, C_8H_{17}-O \rangle P(=O)-OH$ <br> No. 22 p-isopropylphenyl butyl phosphate | LIQUID |
| $(CH_3)_2CH-\bigcirc-O, C_4H_9O \rangle P(=O)-OH$ <br> No. 23 Cacium bis(diphenyl phosphate) | LIQUID |
| $\left(\bigcirc-O\right)_2 P(=O)-O-Ca_{1/2}$ <br> No. 24 Barium bis(di-p-tolyl phosphate) | SOLID M.P. ABOVE 300° C. |
| $\left(CH_3-\bigcirc-O\right)_2 P(=O)-O-Ba_{1/2}$ <br> No. 25 Magnesium bis(di-p-isopropylphenyl phosphate) | SOLID M.P. Above 300° C. |
| $\left((CH_3)_2CH-\bigcirc-O\right)_2 P(=O)-Mg_{1/2}$ <br> No. 26 Calcium bis(di-p-t-butylphenyl phosphate) | SOLID M.P. ABOVE 300° C. |

TABLE 1-continued
PHENYL PHOSPHATE COMPOUNDS

| | PHYSICAL CONDITION |
|---|---|
| No. 27 Calcium bis(di-p-t-amyl phenyl phosphate) 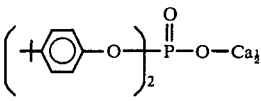 | SOLID M.P. ABOVE 300° C. |
| No. 28 Potassium di(p-methoxyphenyl)phosphate 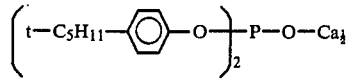 | SOLID M.P. ABOVE 300° C. |
| No. 29 Zinc phenyl phosphate 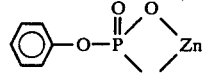 | SOLID M.P. ABOVE 300° C. |
| No. 30 Calcium p-tolyl phosphate 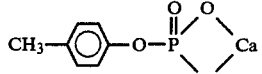 | SOLID M.P. ABOVE 300° C. |
| No. 31 Disodium p-t-butylphenyl phosphate 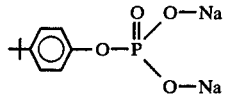 | SOLID M.P. ABOVE 300° C. |
| No. 32 Calcium p-t-amyl phenyl phosphate 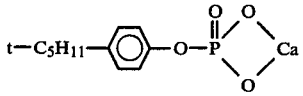 | SOLID M.P. ABOVE 300° C. |
| No. 33 Magnesium bis(phenyl butyl phosphate) 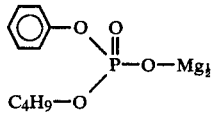 | SOLID M.P. ABOVE 300° C. |
| No. 34 Barium bis(p-tolyl octyl phosphate) 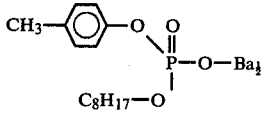 | SOLID M.P. ABOVE 300° C. |
| No. 35 Calcium bis(p-t-butylphenyl octadecyl phosphate) 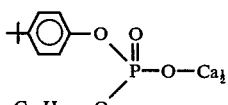 | SOLID M.P. ABOVE 300° C. |
| No. 36 Aluminum tris (p-t-amyl phenyl dodecyl phosphate) 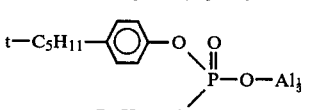 | SOLID M.P. ABOVE 300° C. |
| No. 37 Magnesium bis(di-p-cyclohexylphenyl phosphate) 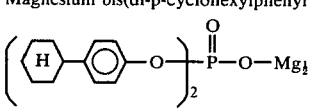 | SOLID M.P. ABOVE 300° C. |
| No. 38 Calcium bis(di(isopropoxycabonyl phenylene)phosphate) | |

TABLE 1-continued
PHENYL PHOSPHATE COMPOUNDS

| | PHYSICAL CONDITION |
|---|---|
| $\left(\begin{array}{c}CH_3\\ \phantom{C}\\ CH_3\end{array}\right.\!\!\!\!\!\!\!CH-O-\overset{O}{\underset{\|}{C}}-\!\!\bigcirc\!\!-O\Bigg)_{\!\!2}\!\!\!\overset{O}{\underset{\|}{P}}-O-Ca_{\frac{1}{2}}$ | SOLID M.P. ABOVE 300° C. |

EXAMPLES 1-1 to 1-16

| | |
|---|---|
| Unstabilized polypropylene resin (Profax 6501) | 100 parts by weight |
| Tetrakis (methylene-3-(3,5-di-t-butyl-4-hydroxyphenyl)propionate) methane | 0.1 |
| Dilaurylthiodipropionate | 0.2 |
| Phenyl phosphate sample (Table 2) | 0.3 |

The above compound was kneaded at 180° C. for 5 minutes on a two-roll mill and then compression molded for 5 minutes at 180° C. and 250 kg/cm² then cooled to 60° C. rapidly to give a specimen of 1.0 mm in thickness.

Haze value was obtained according to ASTM D-1003-61 using the specimen and also izod impact value at 20° C.

The phenyl phosphate samples used and the results are shown in Table-2.

TABLE 2

| NO. | SAMPLES | HAZE VALUE % | IZOD IMPACT STRENGTH VALUE kg·cm/cm |
|---|---|---|---|
| Control | | | |
| 1-1 | None | 83 | 7.5 |
| 1-2 | Adipic acid | 65 | 9.7 |
| 1-3 | Dibenzylidene sorbitol | 60 | 8.6 |
| Example | Phenyl Phosphate | | |
| 1-1 | No. 1 (Table 1) | 48 | 11.8 |
| 1-2 | No. 3 (Table 1) | 54 | 11.2 |
| 1-3 | No. 4 (Table 1) | 45 | 13.0 |
| 1-4 | No. 5 (Table 1) | 53 | 11.6 |
| 1-5 | No. 7 (Table 1) | 43 | 14.5 |
| 1-6 | No. 9 (Table 1) | 45 | 12.4 |
| 1-7 | No. 11 (Table 1) | 47 | 12.2 |
| 1-8 | No. 16 (Table 1) | 44 | 14.9 |
| 1-9 | No. 17 (Table 1) | 43 | 13.4 |
| 1-10 | No. 20 (Table 1) | 54 | 11.3 |
| 1-11 | No. 23 (Table 1) | 46 | 15.7 |
| 1-12 | No. 24 (Table 1) | 48 | 12.1 |
| 1-13 | No. 27 (Table 1) | 43 | 14.6 |
| 1-14 | No. 29 (Table 1) | 45 | 13.2 |
| 1-15 | No. 31 (Table 1) | 42 | 15.5 |
| 1-16 | No. 37 (Table 1) | 46 | 12.8 |

Each phenyl phosphate compound of this invention when compounded with polypropylene provided better clarity and greater impact strength than the use of compounds previously suggested as crystallization modifiers for polypropylene or polypropylene without any added modifier.

EXAMPLES 2-1 to 2-7

| | |
|---|---|
| Unstabilized polypropylene (Profax 6501) | 100 parts by weight |
| Stearylbeta(3,5-di-t-butyl-4-hydroxyphenyl)propionate | 0.1 |
| Distearylthiodipropionate | 0.2 |
| Phenyl phosphate sample (Table 3) | 0.3 |

The above compound was mixed for 5 minutes by mixing and grinding machine, extruded and pelletized by extruder (temperature 220°–250° C., rotation 20 rpm), and then converted to a sheet of 100×40×1 mm by injection molding at 220°–250° C., injection pressure of 475 kg/cm², molding pressure of 570 kg/cm² and cooling time of 10–30 sec.

Haze value and Izod impact strength value were measured in the same way as Example-1.

The phenyl phosphate samples used and the results obtained are shown in Table-3.

TABLE 3

| No. | SAMPLES | HAZE VALUE % | IZOD IMPACT STRENGTH VALUE Kg. cm/cm |
|---|---|---|---|
| Control | | | |
| 2-1 | None | 79 | 7.8 |
| 2-2 | Dibutyl acid phosphate | 62 | 10.2 |
| 2-3 | Dibenzylidene sorbitol | 57 | 10.8 |
| EXAMPLE | Phenyl phosphate | | |
| 2-1 | No. 2 (Table 1) | 53 | 12.1 |
| 2-2 | No. 7 (Table 1) | 42 | 15.4 |
| 2-3 | No. 10 (Table 1) | 48 | 14.7 |
| 2-4 | No. 13 (Table 1) | 45 | 15.2 |
| 2-5 | No. 18 (Table 1) | 47 | 14.3 |
| 2-6 | No. 21 (Table 1) | 48 | 14.5 |
| 2-7 | No. 26 (Table 1) | 43 | 16.0 |

Each phenyl phosphate compound of this invention when compounded with polypropylene provided better clarity and greater impact strength than the use of compounds previously suggested as crystal modifiers or aliphatic phosphate esters lacking the phenyl group required according to this invention.

EXAMPLES 3-1 to 3-13

| | |
|---|---|
| Low density polyethylene resin (Mirason Neo 23H Film grade, Mitsui Polychemical Co., Ltd.) | 100 parts by weight |
| 4,4-thiobis(3-methyl-6-t-butyl-phenol) | 0.1 |
| Phenyl phosphate sample (Table 4) | 0.3 |

The above compound was kneaded at 60° C. for 5 minutes on a two-roll mill then compression molded for 5 minutes at 160° C. and 200 kg/cm², and cooled rapidly to 60° C. to obtain a specimen of 1 mm in thickness.

Haze value was measured according to ASTM D-1003-61 using said specimen.

The phenyl phosphate samples used and the results are shown in Table-4.

TABLE 4

| No. | SAMPLES | HAZE VALUE % |
|---|---|---|
| Control | | |
| 3-1 | None | 73 |
| 3-2 | Adipic acid | 68 |
| 3-3 | Al-p-t-butylbenzoate | 61 |
| EXAMPLE | Phenyl phosphate | |
| 3-1 | No. 1 (Table 1) | 52 |
| 3-2 | No. 4 (Table 1) | 47 |
| 3-3 | No. 6 (Table 1) | 49 |
| 3-4 | No. 8 (Table 1) | 53 |
| 3-5 | No. 12 (Table 1) | 50 |
| 3-6 | No. 15 (Table 1) | 49 |
| 3-7 | No. 22 (Table 1) | 51 |
| 3-8 | No. 25 (Table 1) | 48 |
| 3-9 | No. 28 (Table 1) | 52 |
| 3-10 | No. 30 (Table 1) | 46 |
| 3-11 | No. 32 (Table 1) | 45 |
| 3-12 | No. 35 (Table 1) | 50 |
| 3-13 | No. 38 (Table 1) | 51 |

Each phenyl phosphate compound of this invention when compounded with polyethylene provided better clarity than the use of compounds previously suggested as crystal modifiers or no modifier at all.

EXAMPLES 4-1 to 4-11

| | |
|---|---|
| Polybutene (Film grade M.I. 2.0) | 100 parts by weight |
| Tetrakis (methylene-3-(3,5-di-t-butyl-4-hydroxyphenyl)propionate) methane | 0.1 |
| Distearylthiodipropionate | 0.2 |
| Phenyl phosphate samples (Table 5) | 0.3 |

The above compound was kneaded on a two-mill roll at 130° C. for five minutes, and compression molded for five minutes at 160° C. and 200 kg/cm$^2$, then prepared a specimen of 1.0 mm in thickness by cooling to 60° C.

Haze value was measured according to ASTM D-1003-61 using the specimen.

The phenyl phosphate samples used and the results are shown in Table 5.

TABLE 5

| No. | SAMPLES | HAZE VALUE % |
|---|---|---|
| Control | | |
| 4-1 | None | 86 |
| 4-2 | Triphenylphosphate | 83 |
| 4-3 | Al-p-t-butylbenzoate | 75 |
| EXAMPLE | Phenyl Phosphate | |
| 4-1 | No. 1 (Table 1) | 69 |
| 4-2 | No. 4 (Table 1) | 60 |
| 4-3 | No. 7 (Table 1) | 65 |
| 4-4 | No. 14 (Table 1) | 71 |
| 4-5 | No. 16 (Table 1) | 63 |
| 4-6 | No. 19 (Table 1) | 72 |
| 4-7 | No. 23 (Table 1) | 67 |
| 4-8 | No. 26 (Table 1) | 62 |
| 4-9 | No. 33 (Table 1) | 70 |
| 4-10 | No. 34 (Table 1) | 71 |
| 4-11 | No. 36 (Table 1) | 73 |

Each phenyl phosphate compound of this invention when compounded with polybutene provided better clarity than the use of compounds previously suggested as crystal modifiers or no modifier at all. The comparison with triphenyl phosphate is particularly striking; polybutene with this compound is very slightly better than polybutene with no additive at all; this demonstrates the critical importance of the phosphate compound having per phosphate group one or two phenyl groups according to this invention.

EXAMPLES 5-1 to 5-20

| | |
|---|---|
| Unstabilized polypropylene (Profax 6501) | 100 parts by weight |
| Stearylbeta(3,5-di-t-butyl-4-hydroxyphenyl)propionate | 0.1 |
| Distearylthiodipropionate | 0.2 |
| Di-p-t-butylphenyl phosphate (Table 1 No. 7) | 0.3 |
| Metal compound (Table 6) | 0.3 |

A specimen was prepared in the same way as in Examples 1-1 to 1-16 according to the above formulation and examined for haze value and Izod impact strength.

The metal compounds used and results are shown in Table 6.

TABLE 6

| NO. | METAL COMPOUNDS | HAZE VALUE % | IZOD VALUE Kg cm/cm |
|---|---|---|---|
| EXAMPLE | | | |
| 5-1 | None | 43 | 15.0 |
| 5-2 | Ca-stearate | 26 | 17.2 |
| 5-3 | Al-stearate | 40 | 16.1 |
| 5-4 | Mg-stearate | 35 | 16.4 |
| 5-5 | Ba-stearate | 40 | 15.8 |
| 5-6 | Zn-stearate | 41 | 16.2 |
| 5-7 | Na-stearate | 42 | 15.6 |
| 5-8 | Ca-laurate | 33 | 17.0 |
| 5-9 | Ca-octoate | 24 | 17.6 |
| 5-10 | Ca-benzoate | 30 | 16.9 |
| 5-11 | Ca-sorbate | 36 | 16.5 |
| 5-12 | Ca(OH)$_2$ | 28 | 17.0 |
| 5-13 | Al(OH)$_3$ | 41 | 15.8 |
| 5-14 | Mg(OH)$_2$ | 38 | 16.6 |
| 5-15 | Ba(OH)$_2$ | 39 | 16.2 |
| 5-16 | CaCO$_3$ | 32 | 16.8 |
| 5-17 | CaCl$_2$ | 29 | 17.1 |
| 5-18 | CaO | 26 | 17.3 |
| 5-19 | K$_2$CO$_3$ | 41 | 15.7 |
| 5-20 | BaO | 38 | 16.0 |

These results show that a variety of metal carboxylates and inorganic metal compounds can be used together with a phenyl phosphate of this invention to provide further improvement in both clarity and impact strength of polypropylene.

EXAMPLES 6-1 to 6-12

A specimen was prepared in the same way as in Examples 3-1 to 3-13 according to the following formulation and examined.

The metal compounds used and the results are shown in Table 7.

| | |
|---|---|
| Polyethylene(Mirason Neo23H; Film grade) | 100 parts by weight |
| Tris(3,5-dl-t-butyl-4-hydroxybenzyl) isocyanurate | 0.1 |
| Di-p-tolyl phosphate (Table 1 No. 4) | 0.3 |
| Metal compound (Table 7) | 0.3 |

TABLE 7

| No. | METAL COMPOUNDS | HAZE VALUE % |
|---|---|---|
| Example | | |
| 6-1 | None | 47 |
| 6-2 | Ca-stearate | 40 |

TABLE 7-continued

| No. | METAL COMPOUNDS | HAZE VALUE % |
|---|---|---|
| 6-3 | Ca-octoate | 37 |
| 6-4 | Al-stearate | 45 |
| 6-5 | Ba-stearate | 42 |
| 6-6 | Mg-stearate | 41 |
| 6-7 | Zn-stearate | 44 |
| 6-8 | Li-stearate | 45 |
| 6-9 | Ca(OH)$_2$ | 39 |
| 6-10 | CaCl$_2$ | 41 |
| 6-11 | CaO | 40 |
| 6-12 | SrO | 43 |

These results show that a variety of metal carboxylates and inorganic metal compounds can be used together with a phenyl phosphate of this invention to provide further improvement in clarity of polyethylene.

EXAMPLES 7-1 to 7-11

A specimen was prepared in the same way as in Examples 4-1 to 4-11 according to the following formulation, and examined.

The metal compounds used and the results are shown in Table 8.

| | |
|---|---|
| Polybutylene grade: (Ml value 2.0) | 100 parts by weight |
| Tetrakis (methylene-3-(3,5-di-t-butyl-4-hydroxyphenyl)propionate methane | 0.1 |
| Distearylthiodipropionate | 0.2 |
| Di-p-t-butylphenyl phosphate (Table 1 No. 7) | 0.3 |
| Metal compound (Table 8) | 0.3 |

TABLE 8

| No. Example | METAL COMPOUNDS | HAZE VALUE % |
|---|---|---|
| 7-1 | None | 65 |
| 7-2 | Ca-stearate | 51 |
| 7-3 | Ca-octaoate | 49 |
| 7-4 | Al-stearate | 56 |
| 7-5 | Mg-stearate | 53 |
| 7-6 | Ba-stearate | 53 |
| 7-7 | Zn-stearate | 59 |
| 7-8 | Na-stearate | 55 |
| 7-9 | Ca(OH)$_2$ | 54 |
| 7-10 | CaCl$_2$ | 55 |
| 7-11 | CaO | 53 |

These results show that a variety of metal carboxylates and inorganic metal compounds can be used together with a phenyl phosphate of this invention to provide further improvement in clarity of poly-1-butene.

EXAMPLES 8-1 to 8-3

The effectiveness in polypropylene was compared of various clarifier additives, including sodium di(p-t-butylphenyl) phosphate abbreviated SBP represented by the formula

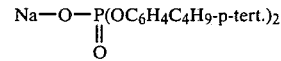

according to this invention, and prior art additives dibenzylidenesorbitol abbreviated DBS (K. Hamada, U.S. Pat. No. 4,016,118) and aluminum p-t-butylbenzoate (M. Wales, U.S. Pat. No. 3,207,737) abbreviated ALB, as well as polypropylene without clarifier additive.

The base formulation and the compounding and processing technique were as shown in Examples 2-1 to 2-7. To study the influence of processing temperatures, extrusion and injection molding were carried out at 250° C. (Test A) and at 220° C. (Test B) with each sample. In addition, samples prepared at 250° C. were kept in boiling water for 10 days and reexamined (Test C). Properties measured were haze value by ASTM D-1003-61 (all samples), crystallization temperature observed on a hot-stage microscope (all samples), oven heat stability at 160° C. (certain samples) and heat distortion temperature under 4.6 kg/cm$^2$ stress (certain samples). The additives used in each sample and results obtained are shown in Tables 9, 10, 11 and 12.

TABLE 9

| | | Haze Value | | |
|---|---|---|---|---|
| SAMPLE | ADDITIVE | TEST A EXTRUSION 250° C. INJECTION 250° C. | TEST B EXTRUSION 220° C. INJECTION 220° C. | TEST C SAMPLES OF TEST A AFTER 100° C. × 10 days in water |
| Control 8-1 | None | 60 | 66 | 67 |
| Example 8-1 | SBP (0.1) | 29 | 32 | 40 |
| Example 8-2 | SBP (0.3) | 29 | 29 | 28 |
| Example 8-3 | SBP (0.5) | 31 | 26 | 37 |
| Control 8-2 | DBS (0.3) | 48 | 35 | 57 |
| Control 8-3 | ALB (0.3) | 47 | 49 | 67 |

TABLE 10

| | | CRYSTALLIZATION TEMPERATURE °C. | | |
|---|---|---|---|---|
| | | TEST A | TEST B | TEST C |
| Control 8-1 | None | 129 | 116 | 110 |
| Example 8-1 | SBP (0.1) | 142 | 133 | 125 |
| Example 8-2 | SBP (0.3) | 146 | 137 | 129 |
| Example 8-3 | SBP (0.5) | 151 | 142 | 133 |
| Control 8-2 | DBS (0.3) | 131 | 118 | 112 |
| Control 8-3 | ALB (0.3) | 148 | 137 | 125 |

TABLE II

| HEAT STABILITY (Oven Life) Test B only | | |
|---|---|---|
| | | At 160° C. Hrs. |
| Control 8-1 | None | 456 |
| Example 8-2 | SBP (0.3) | 480 |
| Control 8-2 | PBS (0.3) | 432 |
| Control 8-3 | ALB (0.3) | 264 |

TABLE 12

| HEAT DISTORTION TEMPERATURE (4.6 Kg/cm² Stress) | | |
|---|---|---|
| | | °C. |
| Control 8-1 | None | 96 |
| Example 8-2 | SBP (0.3) | 122 |
| Control 8-2 | DBS (0.3) | 106 |
| Control 8-3 | ALB (0.3) | 109 |

The results of these tests demonstrate that the additive SBP sodium di(p-t-butylphenyl) phosphate according to this invention is by far the most effective with respect to each property tested, while the prior art additives DBS dibenzylidenesorbitol and ALB aluminum p-t-butylbenzoate are fairly effective in some tests and deficient in others. Thus all the additives are effective in reducing haze in polypropylene processed in the high temperature of 250° C., but SBP at the 0.1 phr use level is more effective than the prior art products at triple this amount. The treatment with boiling water increases the severity of the test in two ways, by a leaching action on the additive and an annealing action on the polymer, thus counteracting the effect produced by the additive.

The results of Test C show that the effectiveness of the prior art additives DBS and ALB is almost totally lost while the effectiveness of the phenyl phosphate SBP according to this invention is well maintained.

We claim:

1. A molded olefin polymer composition having improved clarity as a result of incorporating an additive, comprising a polymer of an alpha-olefin having 2 to 6 carbon atoms and per 100 parts by weight of alpha-olefin polymer from 0.005 to 5 parts by weight of at least one phenyl phosphate compound having the formula

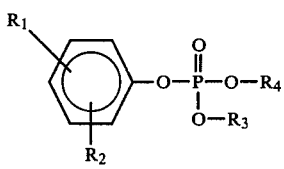

in which $R_1$ and $R_2$ are independently selected from the group consisting of a hydrogen atom, an alkyl group having 1 to 18 carbon atoms, an alkoxy group having 1 to 18 carbon atoms, a cycloalkyl group having 5 to 12 carbon atoms, a phenyl group, and a group

in which $R_5$ is a hydrogen atom or an alkyl group having 1 to 18 carbon atoms; $R_3$ is selected from the group consisting of an alkyl group having 1 to 18 carbon atoms,

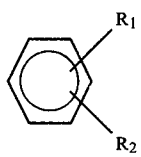

and $R_4$; and $R_4$ is a hydrogen atom or a metal atom equivalent $M_{1/a}$ where a is the valence of the metal atom M and M is selected from the group consisting of barium, calcium, magnesium, potassium, sodium, zinc, and aluminum; and from 0.3 to 3 parts by weight per part by weight of phosphate compound of a metal compound selected from metal salts of non-nitrogenous monocarboxylic acids having 6 to 18 carbon atoms, metal oxides, metal hydroxides, and metal chlorides, the metal being at least one of barium, calcium, magnesium, and strontium.

2. An olefin polymer composition according to claim 1 in which the olefin polymer is polypropylene.

3. An olefin polymer composition according to claim 1 in which the olefin polymer is polyethylene.

4. An olefin polymer composition according to claim 1 in which the olefin polymer is poly-1-butene.

5. An olefin polymer composition according to claim 1 in which the quantity of phenyl phosphate is 0.05 to 0.5 parts by weight per 100 parts by weight of olefin polymer.

6. An olefin polymer composition according to claim 1 in which $R_1$ is a hydrogen atom.

7. An olefin polymer composition according to claim 1 in which $R_1$ is a t-butyl group.

8. An olefin polymer composition according to claim 1 in which $R_3$ is a group

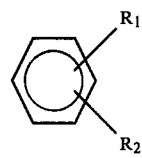

9. An olefin polymer composition according to claim 1 in which $R_3$ is a group $R_4$.

10. An olefin polymer composition according to claim 1 in which $R_4$ is a hydrogen atom.

11. An olefin polymer composition according to claim 1 in which $R_4$ is an equivalent of calcium, barium, magnesium, postasium, zinc, sodium, or aluminum.

12. An olefin polymer composition according to claim 8 in which $R_1$ is hydrogen, $R_2$ is t-butyl, and $R_4$ is a sodium atom.

13. An additive composition for improving the clarity of a molded alpha-olefin polymer having 2 to 6 carbon atoms, comprising a phenyl phosphate compound having the formula

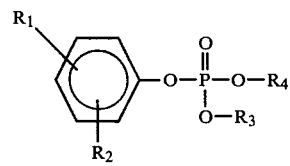

in which $R_1$ and $R_2$ are independently selected from the group consisting of a hydrogen atom and an alkyl group having 1 to 18 carbon atoms; $R_3$ is selected from the group consisting of an alkyl group having 1 to 18 carbon atoms,

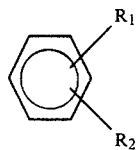

and $R_4$; and $R_4$ is a hydrogen atom or a metal equivalent $M_{1/a}$ where a is the valence of the metal atom M and M is selected from the group consisting of barium, calcium, magnesium, potassium, sodium, zinc and aluminum; and from 0.3 to 3 parts by weight per part by weight of phosphate compound of a metal compound selected from metal salts of non-nitrogenous monocarboxylic acids having 6 to 18 carbon atoms, metal oxides, metal hydroxides, and metal chlorides, the metal being at least one of barium, calcium, magnesium, and strontium.

14. An additive composition according to claim 13 in which $R_1$ is a t-butyl.

15. An additive composition according to claim 13 in which $R_1$ is methyl.

16. An additive composition according to claim 13 in which $R_3$ is

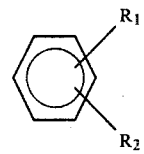

17. An additive composition according to claim 13 in which $R_4$ is hydrogen.

18. An additive composition according to claim 13 in which the metal compound is a carboxylic acid calcium salt.

19. An additive composition according to claim 13 in which the metal compound is calcium oxide.

20. An additive composition according to claim 13 in which the metal compound is calcium hydroxide.

21. An additive composition according to claim 13 in which the relative proportions of phenyl phosphate compound to metal compound range from 0.9 to 1.1 up to 1.1 to 0.9 by weight.

* * * * *